United States Patent [19]

Grinstead et al.

[11] 4,031,038

[45] June 21, 1977

[54] WATER INSOLUBLE CHELATE EXCHANGE RESINS HAVING A CROSSLINKED POLYMER MATRIX AND PENDANT THERETO A PLURALITY OF METHYLENEAMINOPYRIDINE GROUPS

[75] Inventors: Robert R. Grinstead, Walnut Creek; Wilmonte A. Nasutavicus, Lafayette, both of Calif.

[73] Assignee: The Dow Chemical Company, Midland, Mich.

[22] Filed: June 16, 1975

[21] Appl. No.: 587,185

[52] U.S. Cl. .................. 260/2.2 R; 75/101 BE; 260/2.1 R; 260/79.5 NV; 423/24; 423/139; 526/30; 526/50; 526/19

[51] Int. Cl.² .................. B01D 15/04; C08F 26/06

[58] Field of Search ..... 260/2.1 R, 2.2 R, 79.5 NV; 75/101 BE; 423/24, 139; 526/50, 30

[56] References Cited

UNITED STATES PATENTS

| | | | |
|---|---|---|---|
| 3,337,480 | 8/1967 | Small | 260/2.2 R |
| 3,473,921 | 1/1969 | Schmucklea | 260/2.2 R |
| 3,873,668 | 3/1975 | Melby | 260/2.2 R |

FOREIGN PATENTS OR APPLICATIONS

| | | | |
|---|---|---|---|
| 862,636 | 4/1958 | United Kingdom | 75/101 BE |

OTHER PUBLICATIONS

"Ion Exchange", Ed. Marinsky, Dekker, N.Y. 1969 Chapter 6.
Ion Exchange and Solvent Extraction of Metal Complexes, Marcus–Kerter, Wiley Interscience Nov. 1970.
J.A.C.S. vol. 82, No. 19, pp. 5013–5023, Goodwin–Lions.
"Inorganic Chemistry", vol. 7, No. 3, Mar. 1968 Gruenwedel.
Analytica Chem. Arts, 66 (1973) 231–237, Elsevier—Eides et al. (Author).
Chem. Abstracts, vol. 81, Entry 170347h.
Chem. Abstracts, vol. 81, Entry 14368k.
Chem. Abstracts, vol. 81, Entry 159382v.

*Primary Examiner*—Joseph L. Schofer
*Assistant Examiner*—Peter F. Kulkosky
*Attorney, Agent, or Firm*—David B. Kellom

[57] ABSTRACT

New chelate exchange resins capable of selective recovery of copper, nickel, and other valuable metals from an acidic aqueous leach liquor are prepared by reacting a crosslinked haloalkyl polymer matrix resin (I) with certain aminopyridines (II) to give a resin (III)

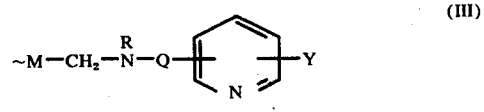

with pendent methyleneaminopyridine groups attached to the matrix resin. Particularly useful resins are obtained by reacting chloromethylated styrene-divinylbenzene copolymer beads with an aminomethylpyridine, such as 2-picolylamine, N-methyl-2-picolylamine, N-(2-hydroxyethyl)-2-picolylamine, N-(2-methylaminoethyl)-2-picolylamine, or bis-(2-picolyl)amine. At a typical copper ore leach liquor pH of about 2, the picolylamine resins will absorb 15–30 mg copper/ml resin with a 5–10 fold selectivity for copper over ferric iron.

20 Claims, No Drawings

WATER INSOLUBLE CHELATE EXCHANGE RESINS HAVING A CROSSLINKED POLYMER MATRIX AND PENDANT THERETO A PLURALITY OF METHYLENEAMINOPYRIDINE GROUPS

BACKGROUND OF THE INVENTION

Ion exchange resins have been used in many areas for the recovery of valuable materials from aqueous solution. They are particularly suitable for processing dilute aqueous solutions frequently encountered in hydrometallurgy. Their insolubility eliminates the problem of contamination of the effluent stream and their chemical and mechanical stability reduces the economic loss of the active material. Also resins can be used with an unfiltered slurry of ore leach liquor where the difference in settling rate between the fine ore slurry particles and the larger, faster settling resin beads is a significant advantage. A further advantage is their utility with solutions too dilute for effective use of liquid-liquid extractants.

However, ion exchange resins are relatively nonselective for heavy metal ions, particularly at the acid pH of many ore leach liquors. Conventional cation exchange resins will absorb metal cations, and weak carboxylic acid resins are somewhat more selective than sulfonic acid resins. But both are relatively inactive at pH 1–4. Anion exchange resins, including the crosslinked vinylpyridine resins of D'Alelio U.S. Pat. No. 2,623,013 and the weak base ammonia epichlorohydrin resins of Anderson & Scheddel U.S. Pat. No. 3,340,208, also do not provided the selectivity necessary for many hydrometallurgical applications.

Greater selectivity is obtained with chelate exchange resins such as the resinous polymers of vinylaryl aminocarboxylic acids described by Morris U.S. Pat. No. 2,875,162. The use of these resins in recovery of copper, nickel, and cobalt from aqueous solutions is described in Mock, Calkins & Marshall U.S. Pat. No. 2,980,607 and Hampton & Mock U.S. Pat. No. 2,993,782. Melby U.S. Pat. No. 3,873,668 describes another copper selective resin containing 2,2'-bis(2''-pyridylmethylamino)biphenyl chelant ligands. Numerous other chelate exchange resins have been reported, for example, see Wheaton & Hatch in "Ion Exchange", J. H. Marinsky, ed., New York 1969, Vol. II, 221–2. But in spite of considerable effort, no chelate resins have yet demonstrated the requisite metal capacity, selectivity and cost performance essential for wide spread commercial use in such hydrometallurgical operations as the recovery of copper from acid leach liquors.

Stability constants have been reported by D. W. Gruenwedel, Inorg. Chem. 7, 495 (1968), for certain picolylamines as complexing agents for copper. H. A. Goodwin & F. Lions, JACS 82, 5013 (1960) describe several quadridentate chelate compounds containing picolylamine moieties. However, no mention is made of a polymer containing these moieties or of their chelate selectivity.

SUMMARY OF THE INVENTION

A new class of chelate resins has been synthesized having a plurality of aminopyridine groups attached to a water-insoluble polymer matrix. These resins can be prepared by reacting a crosslinked haloalkyl polymer matrix resin (I) with certain aminopyridines (II) to give a resin (III) with pendent methyleneaminopyridine groups attached to the matrix resin; i.e.:

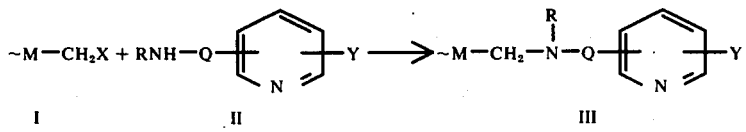

wherein
M is the matrix resin;
Y is H or $C_1$–$C_4$ alkyl;
Q is (1) —$CH_2$—;
  (2) —$(C_2H_3R'NR')_x$—$CH_2$— where each R' is H or $CH_3$ and $x$ is 1 or 2; or
  (3) —, —NH—, —$C_2H_4$—; and
each R is
  (1) H, $C_1$–$C_4$ alkyl, or $C_2$–$C_4$ hydroxyalkyl;
and when Q is —$CH_2$—, R can also be:
  (2) allyl, benzyl or o-hydroxybenzyl;

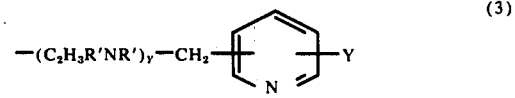

wherein each R' is H or $CH_3$ and $y$ is 0 or 1;
  (4) —$(CH_2)_mOY$ where $m$ is 2 or 3;
  (5) —$C_2H_3R'NR_1R_2$ where R' is H or $CH_3$, $R_1$ is H, $C_1$–$C_4$ alkyl, $C_2$–$C_4$ hydroxyalkyl, phenyl or benzyl, and $R_2$ is H, $C_1$–$C_4$ alkyl or $C_2$–$C_4$ hydroxyalkyl;
  (6) —$C_2H_4SR'''$ where R''' is $C_1$–$C_4$ alkyl;
  (7) —$C_nH_{2n}COOY$ where $n$ is 1 or 2;
  (8) —$C_nH_{2n}SO_3^-$ where $n$ is 1 or 2; or
  (9) —$CH_2Z$ where Z is —$CONH_2$ or —$NHCONH_2$.

Preferably the polymer matrix is a crosslinked chloromethylaromatic resin, such as a chloromethylated styrene-divinylbenzene or phenol-formaldehyde polymer, and the amine is a 2-picolylamine. Such a resin prepared from a styrene-divinylbenzene copolymer contains a plurality of groups of Formula IV:

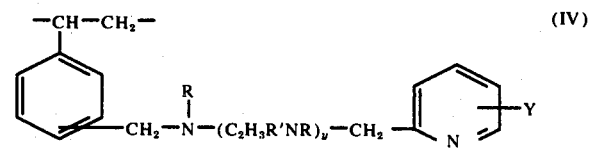

where $y = 0$–2. Particularly useful are resins containing about 0.1–4.5 meq 2-picolylamine per g resin.

These new chelate resins have a high capacity for removal of heavy metals, particularly copper and nickel, from dilute aqueous solution at a pH between about 1–5. Although the selectivity is pH dependent, they have a significant selectivity for copper and nickel over ferric iron within this pH range. Thus they can be used for the selective recovery of copper and nickel from an iron containing acidic leach liquor by (A) contacting the ore leach liquor at an appropriate pH of between about 1–5 with the aminopyridine resin, (B) eluting the absorbed copper or nickel with a strong inorganic acid or ammonia, and (C) reducing the concentrated eluent to obtain the copper or nickel in metallic form.

DESCRIPTION OF THE INVENTION

A. Matrix Resins

The new chelate exchange resins can be prepared by addition of the methyleneaminopyridine functional groups to an insoluble resin matrix. As pointed out by Wheaton & Hatch, op. cit., page 194–221, a variety of crosslinked aromatic condensation and addition polymers have been used as the backbone polymer or matrix for commerical ion exchange resins. Such aromatic backbone resins are particularly suitable as the resin matrix herein because of ease of halomethylation and the stability of the resulting chelate resins. However, many other polymeric resin matrices can be used, such as amine-epichlorohydrin resins, graft polymers of styrene on water-insoluble polyethylene or polypropylene, the crosslinked 2-chloromethyl-1,3-butadiene polymers of Jones e.a. U.S. Pat. No. 3,673,164, etc.

For many purposes, 20–50 mesh resin beads are a particularly effective form for the matrix resin and final product. However, the chelate resin can also be prepared as a film, membrane, fiber, chip or other physical form depending primarily on the form of the initial matrix resin.

The new chelate exchange resins are conveniently prepared from standard ion exchange resin matrices. Particularly suitable are crosslinked vinyl copolymers of a monovinylaromatic monomer such as styrene, alpha-methylstyrene, chlorostyrene, vinyltoluene, or vinylnaphthalene, crosslinked with a polyvinyl monomer such as divinylbenzene, ethylene glycol dimethacrylate, diallyl succinate, divinyltoluene, etc. The basic technology for producing ion exchange resins from such aromatic resins was developed prior to 1953 as shown, for example, in U.S. Patents by Staudinger e.a. No. 2,089,444, D'Alelio No. 2,366,007, Boyer No. 2,500,149, McBurney No. 2,591,573, and Bauman ea No. 2,614,099. Typically a mixture of styrene and divinylbenzene is dispersed in water and polymerized to form copolymer beads which are then further reacted to form cation or anion exchange resins. More recently Mindick & Svarz U.S. Pat. No. 3,549,562 and Corte & Meyer U.S. Pat. No. 3,637,535 have described a process for making more porous copolymer beads.

Thereafter the aromatic polymers are halomethylated to introduce an average of about 0.1–1.0 halomethyl groups per aromatic group as the reactive site for addition of the aminopyridine chelate functionality. Alternately, the intermediate halomethyl copolymers can also be prepared by copolymerization of vinylbenzyl chloride as described, for example, in Clarke & Hamerschlag U.S. Pat. No. 2,780,604, McMaster U.S. Pat No. 2,992,544, and Barrett U.S. Pat. No. 3,843,566. The degree of chloromethylation is an important process variable since normally one chelant group is introduced for each reactive chloromethyl group.

B. Aminopyridines

Aminopyridines of Formula II are generally known heterocyclic compounds; Cf Weissburger "The Chemistry of Heterocyclic Compounds" Vol. 14, New York 1961. Of particular interest herein are the 2-picolylamine derivatives of Formula V:

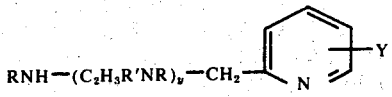

Such 2-picolylamines can be prepared, for example, by hydrogenation of 2-cyanopyridine or by reaction of 2-picolyl chloride with an appropriate amine or alkylenepolyamine such as methylamine, monoethanolamine, ethylenediamine, propylenediamine, etc. Although chelate stability constants have been reported for bis(2-picolylamine) and several related amines, but no resins with bidentate aminopyridine functionality have been described.

After screening many aminopyridine resins, several were identified as particularly effective for the recovery of copper from an acid leach liquor at about pH 2–3. They were the resins from 2-picolylamine, N-methyl-2-picolylamine, N-(2-hydroxyethyl)-2-picolylamine, N-(2-methylaminoethyl)-2-picolylamine and bis-(2-picolyl)amine.

C. Resin Synthesis

The aminopyridine chelate resins are conveniently prepared using conventional ion exchange technology by reacting the solid haloalkyl polymer matrix with the desired amine in the presence of a suitable liquid diluent, such as methylene chloride, chloroform, 1,2-dichloroethane, toluene, methanol or water for several hours. Preferably a 2–3 fold excess of amine is added to a slurry of chloromethylated matrix resin at 20°–50° C, and then the mixture is refluxed for 1–5 hours. Thereafter the diluent is removed and the resin product rinsed free of excess amine with an appropriate liquid such as acetone or aqueous alcohol and finally with water. The new chelate resins are normally used in a water wet acid salt form, but are also quite stable in free base form.

While the standard chloromethylation-amination process is satisfactory for most of the new chelate resins, the alternate synthesis suggested by Wheaton & Hatch, op. cit., page 219–221, or the modified process of Small U.S. Pat. No. 3,337,480 may be of value for certain resins.

D. Evaluation of Resin Properties

In form, the new chelate resins are similar in shape to the initial polymer matrix resin. Their physical and chemical properties can be characterized in part by standard methods used for the evaluation of ion exchange resins. Typically the resin density, water holding capacity, strong base capacity, tertiary amine capacity, and volume shrink-swell are measured. For these tests, the resin is normally converted into a free base form by washing with 0.1 N ammonium hydroxide, then with 1 N sodium chloride, and finally water. This sequence converts all the non-quaternary ammonium groups to free base form, and the strong base quaternary ammonium groups to chloride form. Elemental analysis of the resin in a dry salt or free base form can be used to confirm the degree of amination.

Chelate activity is conveniently screened by shaking the resin with aqueous copper sulfate (10 g Cu/l; pH 4.0) for 24 hours. The resin is recovered, washed with water and the adsorbed copper eluted with 1 N sulfuric acid. For the stronger chelate resins derived bis-(2-picolylamine), elution requires 10 N sulfuric acid or 7 N ammonium hydroxide. The copper in the eluate is then determined and the loading capacity calculated. The observed equilibrium loading values for the active picolylamine resins correspond quite closely to the theoretical 1:1 ratio based on elemental nitrogen.

Active resins are further evaluated by equilibration for 24 hours with a test solution containing 2 g copper and 5 g ferric iron per liter at pH 2.0. By measuring the relative copper and iron content of the resin and also its elution characteristics, the chelate selectivity and capacity of the resin in the pH range of practical interest can be determined. (Cf. Wadsworth, U.S. Pat. No. 3,868,439).

To determine the kinetic behavior of the active chelate resins, a copper sulfate solution (1 g Cu/l) is passed through a small column of resin in acid form. At given time intervals, the resin bed is sampled and the adsorbed copper determined. Using a 24 hour sample as an equilibrium sample, the time to reach 50 percent of equilibrium loading can be readily calculated.

Initial data on resin selectivity with other metal ions can be obtained by similar techniques. Copper, nickel, ferric iron, cobalt, silver, gold, mercury, platinum, vanadium, molybdenium, chromium and cadmium are highly adsorbed while calcium, magnesium, aluminum, and ferrous iron are more weakly adsorbed. Except for ferric iron, the strongly adsorbed ions are those of usual economic interest in hydrometallurgical leach operations. The two metals of greatest current interest, copper and nickel, are both more strongly adsorbed from acidic leach liquors by the aminopyridine resins than ferric iron under practical operating conditions.

E. Use in Hydrometallurgical Operations

The basic technique for hydrometallurgical separations with chelate resins is described in Mock e.a. U.S. Pat. No. 2,980,607 using a chelate resin having a crosslinked styrene-divinylbenzene matrix and iminodiacetic acid groups as the chelate functionality. Such a resin is commercially available as Dowex A—1 resin. While this resin has been widely used for analytical purposes, its selectivity at a pH of 5 or less is inadequate for commercial processing of acidic leach liquors.

The aminopyridine resins provide a significant improvement in selectivity for the recovery of desired metal ions from an acid leach liquor. At the same time with the preferred styrene-divinylbenzene resin matrix, they retain the proven stability and adaptability of this copolymer matrix. Further tests have established that the 2-picolylamine resins from chloromethylated styrene-divinylbenzene copolymers operate effectively at flow rates encountered in commercial ion exchange operations using feed liquors containing as low as about 50 mg/l of copper or other heavy metal in aqueous solution at a pH of about 1.0–4.5 and operating temperatures ranging from about 10°–g/l C. Preferably for the bidentate picolylamine resins, the feed liquor should contain about 0.1–10 g/l of the desired metal and have a pH of about 1.5–3.0. Optimum conditions will, of course, depend on the specific resin and process stream.

Initial work indicates that the chelate resins with a macroporous matrix have somewhat better kinetics although lower loading capacity per milliliter of wet resin then do the resins based on a gel copolymer. The selectivity of the aminopyridine chelate resins with acid feed liquors is good, yet at the same time the adsorbed metal species can be readily eluted in more concentrated form for further processng. For example, copper can be recovered in an eluate sufficiently pure to be fed directly to an electrowinning cell.

To illustrate further the present invention, the following specific examples are given. Unless otherwise specified, all parts and percentages are by weight and all analyses are by standard methods used in ion exchange and chelate technology.

EXAMPLE 1

N-Methyl-2-Picolylamine Resin

A. A slurry of 10 parts of 50–100 mesh chloromethylated styrene-1.8 percent DVB copolymer containing 19.2 percent chlorine in excess toluene was warmed for 30 minutes to swell the beads. The excess toluene was removed from the swollen beads and 16.1 parts (0.132 mole) N-methyl-2-picolylamine (MPA) added. Sufficient toluene was added to give a fluid slurry and the mixture refluxed for 5 hours. The slurry was filtered through a course 20 mesh screened to separate the resin beads from lumps of by-product amine hydrochloride. The toluene was removed and the MPA resin beads were washed with water and slurried with 100 parts of 1.2 N HCl.

The resin had an exchange capacity of 0.74 meq/ml of wet resin and a water holding capacity of 59 percent. The dry resin in free base form had a capacity of 3.1 meq/g. The ratio of wet resin volume in HCl form/free base form was 1.4.

A column containing 12 ml of resin in hydrochloride form in a 50 ml burette was used to determine the behavior of the MPA resin on a simulated copper leach solution containing 0.85 g/l copper and 1.4 g/l ferric iron as sulfates with a pH of 1.7. A flow rate of about 1.8 ml/min was used and the effluent monitored for copper and iron. The effluent copper concentration did not reach 50 percent of the feed level until after 12 bed volumes had passed through the resin column while the iron breakthrough occured after only a few bed volumes. After passage of about 25 bed volumes of feed, the column was washed with several bed volumes of water and eluted with 1 N sulfuric acid. Analysis of the eluate indicated a resin loading of 10 mg Cu and 2 mg Fe per milliliter of resin bed, a Cu/Fe ratio about 10 fold greater than that of the feed liquor. This selectivity demonstrates the utility of the MPA resin for treating dilute acidic leach liquors and waste streams.

In a similar run with a commercial iminodiacetic acid chelate resin (Dowex A-1 resin from The Dow Chemical Company) and the same feed solution, the loading after 25 bed volumes of feed was 5 mg Cu and 9 mg Fe per ml resin bed, essentially the same ratio as the feed.

B. Subsequent preparations using a macroporous 8 percent DVB copolymer, a diluent of toluene-10 percent methanol and a 4 hour reflux gave MPA resins containing typically 7.3 percent N and having a water holding capacity of 49 percent, a density of 0.25 g/ml an exchange capacity of about 1.84 meq/g, and a kinetic half time for Cu adsorption of 6.8 min using a 1 g/l $CuSO_4$ solution.

EXAMPLE 2

Bis-(2-Picolylamine)Resin

A Bis-(2-picolylamine) (BPA) was prepared in 95 percent yield by condensing 2-picolylaldehyde with 2-picolylamine followed by hydrogenation of the Schiff base using a 5 percent Pd/C catalyst. (Cf. Gruenwedel, Inorg. Chem., 7, 496 (1968)).

B. To 68.4 parts (0.45 mole) chloromethylated styrene-1.8 percent divinylbenzene copolymer beads (20.1 percent Cl) swollen in 40 parts toluene was added 180 parts (0.90 mole) bis(2-picolylamine) and the mixture was refluxed for 6 hours. After cooling, the toluene was removed by filtration and the beads slurried with water to dissolve the excess amine salt. The chelate resin beads were then converted into chloride salt form by stirring overnight with excess 1 N HCl.

Elemental analysis of a sample of the BPA resin after treatment with excess NaOH indicated 91–2 percent amination of the chloromethylated groups. The resin in hydrochloride form had a water content of 56 percent and an exchange capacity of 1.1 meq/ml wet resin and a $pK_a$ of 3.4.

C. The behavior of the BPA resin toward copper, nickel and iron was determined using small test columns of the resin. With a simulated copper leach solution containing 0.9 g Cu and 1.6 g Fe (III) per liter as sulfates at pH 1.7, copper in the effluent did not reach 10 percent of feed level until about 25 bed volumes had been treated and 85 bed volumes of feed were processed before complete saturation of the resin. The saturated resin contained about 42 mg Cu/ml and 6 mg/ml Fe, a total metal loading corresponding to about 1 mole per mole of amino nitrogen.

Elution with 1 N acid removed the adsorbed iron, but not the more strongly held copper thus providing further separation. The copper was removed with 10 N acid giving an eluate containing about 95 percent of the adsorbed copper with an iron content of only about 0.1 percent based on copper.

In a similar test with a solution containing 1.1 g/l each of nickel and ferrous sulfate, selective nickel adsorption was obtained. After complete loading of the resin with about 50 bed volumes of feed, the resin contained about 32 mg Ni and 1.5 mg Fe per ml of resin bed. Under the same conditions the commercial iminodiacetic acid resin adsorbed only 3.4 mg Ni and 0.4 mg Fe per ml of resin. The adsorbed nickel was readily eluted with 1 N $H_2SO_4$.

Further studies indicated that the BPA resin will adsorb up to about 50 mg Cu/ml at pH 2 when equilibrated with aqueous solutions containing as little as 50 mg Cu/l. Loading is only slightly less at pH 1. The copper containing resin can be regenerated with 7 N ammonium hydroxide as well as with 10 N sulfuric acid. Since regeneration does require strong acid or ammonium hydroxide, the BPA resin is probably too strong an adsorbent for copper under the conditions anticipated for processing ore leach liquors. However it remains an excellent resin for treating waste streams containing very low levels of copper.

D. A toluene slurry of commercial 20–50 mesh chloromethylated macroporous styrene - 6% DVB copolymer beads containing 20 wt. percent chlorine was heated for 16 hours at 80° C with a 2-fold excess of bis(2-picolylamine). The aminated resin was recovered, washed and converted into hydrochloride form. The dry resin had a density of 0.29 g/ml, contained 8.8 percent N, and absorbed 0.5 meq Cu/ml wet resin when tested with a simulated copper leach liquor.

In subsequent experiments, BPA was attached to other S/DVB matrix resins including a 2 percent crosslinked gel bead and 6–8 percent crosslinked macroporous beads. resulting BPA resins showed comparable copper selectivity. Elemental analyses indicated about 65 percent of the aromatic rings were substituted in the gel resin and about 40 percent for the macroporous resin. The equilibrium loading of the 6 percent XL macroporous resin was 30 mg Cu/ml at pH 2.0, 24 mg Cu/ml with 3 N $H_2SO_4$, and 4.4 mg Cu/ml with 10 N $H_2SO_4$ indicating the very strong copper pickup.

EXAMPLE 3

N-((2-Hydroxyethyl) -2-Picolylamine Resin

A. To a slurry of 16 parts of commercial 20–50 mesh chloromethylated macroporous styrene - 6% divinylbenzene copolymer beads containing 20 percent chlorine in 28 parts water containing 7 parts of sodium sulfate was added 13.0 parts (0.086 mole) N-(2-hydroxyethyl)-2-picolylamine (HPA). The mixture was refluxed for 3 hours and then filtered to recover the resin product having a density of 0.29 g/ml in free base form and containing 8.0 percent N.

When equilibrated with aqueous copper sulfate (1 g Cu/l, pH 2.0), the resin adsorbed 27 mg Cu/ml resin.

B. To a slurry of 16.5 parts of commercial chloromethylated macroporous S/6% DVB copolymer beads with 10 parts sodium carbonate and 21 parts water was added 14 parts HPA (93% active). The mixture was refluxed for 3.5 hours and the resin product recovered. When equilibrated with aqueous copper sulfate (1 g Cu/l, pH 2.0) the resin adsorbed 27 mg Cu/ml resin.

EXAMPLE 4

2-Picolylamine Resin

A. In another typical resin preparation, 62 parts of 50–100 mesh chloromethylated gel styrene-divinylbenzene beads (1.8 percent DVB; 19.2 percent Cl) was slurried with 30 parts toluene for 15 minutes at room temperature. Then to the mixture of swollen copolymer was added 7.1 parts (0.067 mole) of 2-picolylamine. After refluxing for 4 hours, the mixture was cooled and the toluene was drained off. The beads were washed thoroughly with acetone, water and then with 2,000 parts of 0.1 N $H_2SO_4$.

When equilibrated with a solution of copper sulfate (1 g Cu/l) at pH 2.0, the resin adsorbed 0.42 meq Cu/ml of resin. Equilibrated with 1 N HCl it had an exchange capacity of 0.88 meq/ml wet resin. In dry free base form it had an exchange capacity of 3.1 meq/g. Its moisture content was 26 percent and its swelling ratio measured as wet resin volume in $HCl/OH^-$ form was 1.5.

B. In a similar manner using a chloromethylated macroporous S/8 percent DVB resin matrix, a 2-picolylamine resin was prepared having a density of 0.28 g/ml, a water holding capacity of 44 percent, 7.5 percent N, and a copper capacity of 0.54 meq/ml.

EXAMPLE 5

N-(2-Picolyl)-N'-(2-Hydroxyethyl)Ethylenediamine Resin

To a slurry of 5.3 parts of dry chloromethylated S/1.8 percent DVB gel copolymer containing 19 percent Cl swollen in about 20 parts of toluene was added 11 parts of N-(2-picolyl)-N'-(2-hydroxyethyl)ethylenediamine (HEPA). The mixture was refluxed for 4 hours. Then the HEPA resin was recovered, washed and converted to free base form by washing successively with 0.1 N sulfuric acid, 0.1 N ammonium hydroxide, 1 M sodium chloride and finally water. The resin contained 8.8 percent N, and adsorbed 22 mg Cu and 3 mg Fe/ml resin when equilibrated with a solution containing 1 g/l each of copper and ferric iron at pH 2.0.

EXAMPLE 6

Picolylamine Resin — Phenolic Matrix

A commercial weak anion exchange resin, an aminated phenol-formaldehyde resin having an exchange capacity of 9.1 meq/g dry resin and 2.8 meq/ml wet resin (Duolite A-7 resin from Diamond Shamrock Chemical Co.), was coverted to free base form with aqueous $NaHCO_3$. Then 17 parts of the resin was added to 100 parts of water containing 5.3 parts (42 mmoles) 2-chloromethylpyridine .HCl and 7.1 parts (84 mmoles) $NaHCO_3$. The mixture was stirred at room temperature for 48 hours and then the resin recovered, washed and converted into salt form with excess 0.5 N $H_2SO_4$.

A sample of the resin product was shaken for 24 hours with an aqueous solution containing 2 g Cu and 5 g Fe (III) per liter at pH 2.0. The resin was recovered and the adsorbed Cu and Fe eluted with 1 N $H_2SO_4$. The chelate resin adsorbed 4.8 mg Cu and 6.2 mg Fe per ml resin while the original Duolite A-7 resin adsorbed 0.5 mg Cu and 13.8 meq Fe/ml.

EXAMPLE 7

General Resin Synthesis

Using the general methods of Examples 1–6, a wide variety of aminopyridine resins were synthesized using chloromethylated S/DVB copolymer beads as the matrix resin and evaluated for adsorption of copper from dilute aqueous solutions (2 g Cu/l) at pH 2–4. In general, resins made with macroporous copolymer beads have better loading kinetics although somewhat lower total copper capacity. However, the focus of the synthesis work was primarily on the functional group and its attachment to the matrix resin, rather than maximizing resin capacity and kinetics.

Typical results of the synthesis and screening program are given in Table I. Clearly the structure of the aminopyridine is a significant factor in resin activity. Substitution of chloro or nitro groups on the pyridine ring, or of isopropyl, t-butyl, cyclohexyl, or phenyl groups on the amino nitrogen (i.e., R or R' in Formula V) gave essentially inactive resins with a copper pickup of <0.04 mg/ml at pH 2–4. While these tests show that 2-picolylamine resins of the general Formula VI:

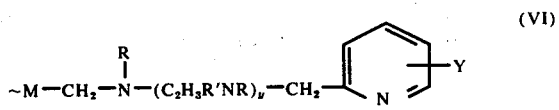

(VI)

to be particularly active for copper at pH 2–4, the other resins in Table I also show a useful activity. Because of the effect of structure on chelate stability and selectivity, the flexibility in structure of the functional aminopyridine groups attached to the water-insoluble polymer resin matrix is of considerable value in developing selective adsorbents for a variety of hydrometallurgical operations.

TABLE I

Aminopyridine Chelate Resins

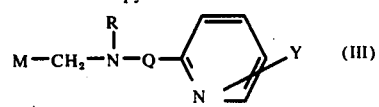

(III)

| | | | S/DVB Beads | | | Resin Product[c] | | | Absorption, mg/ml resin H+form[d] | | | | | |
| | | | | | | | | | pH 2 | | | | pH 4 | |
| Resin No | Resin Structure (III: Y = H) | | Type[a] | % DVB | Prcs[b] | WHC | % N | g/ml | Cu | Fe (III) | Ni | Co | Cu | Ni | Co |
| | Q | R | | | | | | | | | | | | | |
|---|---|---|---|---|---|---|---|---|---|---|---|---|---|---|---|
| 7-1 | —CH₂— | —CH₃ | gel | 0.8 | A | 55 | 10.0 | 0.25 | 21[e] | 7[e] | | | | | |
| 7-2 | —CH₂— | —C₂H₅ | gel | 1.8 | A | 30 | 7.3 | 0.47 | | | | | 4[f] | | |
| 7-3 | —CH₂— | —C₃H₇ | gel | 1.8 | A | 26 | 8.5 | 0.43 | 13 | 11 | 0.1 | 0.1 | 24 | 0.3 | 0.1 |
| 7-4 | —CH₂— | —CH₂ φ | gel | 1.8 | A | 26 | 7.9 | 0.40 | 11 | 6.8 | 0.5 | 0.1 | <2 | 1.0 | 0.3 |
| 7-5 | —CH₂— | —CH₂—CH=CH₂ | gel | 1.8 | A | 38 | 8.9 | 0.33 | 14 | 1.2 | 0.1 | 0.1 | 0.4 | 0.1 | 0.1 |
| 7-6[g] | —C₂H₄NHCH₂— | —CH₃ | gel | 1.8 | A | 27 | 10.6 | 0.43 | 26 | 6 | 1.1 | 0.2 | 12 | 2.2 | 1.1 |
| 7-7 | —C₂H₄NHCH₂— | —CH₃ | mp | 6.0 | E | 46 | 7.4 | 0.30 | 7.4 | 0.7 | 0.1 | 0.9 | 12 | 0.1 | 0.1 |
| 7-8 | —CH₂— | —C₂H₄NHφ | gel | 1.8 | A | 31 | 9.9 | 0.39 | 14 | 0.9 | <2 | <2 | <2 | <2 | <2 |
| 7-9 | —CH₂— | —C₂H₄N(CH₃)φ | gel | 1.8 | A | 33 | 4.2 | 0.40 | 10 | 3.3 | 0.2 | 0.1 | 1.3 | 0.2 | 0.1 |
| 7-10 | —CH₂— | —C₂H₄OCH₃ | gel | 1.8 | A | 20 | 7.9 | 0.55 | 16 | 2.4 | 2.6 | 0.3 | 26 | 7.8 | 1.5 |
| 7-11 | —CH₂— | —C₂H₄OC₂H₅ | mp | 6.0 | A | 56 | 7.3 | 0.27 | 6 | 1.7 | 0.8 | 0.8 | 10 | 0.8 | 0.8 |
| 7-12 | —CH₂— | —C₂H₄SCH₃ | gel | 1.8 | A | 18 | 7.3 | 0.44 | 18 | 4.1 | 2.6 | 0.3 | 31 | <2 | <2 |
| 7-13 | —CH₂— | —CH₂-⟨C₆H₃(OH)⟩ | gel | 1.8 | A | 13 | 7.3 | 0.61 | 4.2 | 2.5 | 0.3 | 0.6 | <0.1 | <0.1 | <0.1 |
| 7-14 | —CH₂— | —CH₂CONH₂ | gel | 1.8 | C | 34 | 10.7 | 0.42 | 12 | 2.1 | 1.0 | 0.2 | 16 | <0.1 | <0.1 |
| 7-15[h] | —CH₂— | —CH₃ | gel | 1.8 | A | 29 | 9.5 | 0.43 | <2 | 6.0 | 0.2 | 0.2 | 7.9 | 0.2 | <0.1 |
| 7-16 | —CH₂— | —CH₂COOC₂H₅ | gel | 1.8 | A | 19 | 7.5 | 0.45 | 20 | 3.3 | 0.4 | 0.1 | 15 | 0.7 | 0.4 |
| 7-17 | —CH₂— | —CH₂COOH | gel | 1.8 | A | 43 | 7.7 | 0.32 | 20 | 43 | 0.8 | 0.1 | 31 | 1.3 | 0.2 |
| 7-18 | —CH₂— | —C(CH₃)(CH₂OH)₂ | gel | 1.8 | A | 22 | 8.3 | 0.47 | 5.4 | 2.3 | 0.2 | 0.1 | 0.2 | <0.1 | <0.1 |
| 7-19 | —CH₂— | —C₂H₄OH | mp | 6.0 | A | 52 | 8.7 | 0.30 | 22 | 4.7 | 2.5 | | <2 | | |
| 7-20 | —C₂H₄— | —H | mp | 8.0 | A | 48 | 6.6 | 0.31 | <2 | 24 | <2 | <2 | | | |
| 7-21 | —C₂H₄— | —CH₃ | mp | 8.0 | A | 46 | 8.1 | 0.30 | <2 | 22 | <2 | <2 | | | |
| 7-22 | —NH— | —H | gel | 1.8 | A | 24 | 12.8 | .47 | 6.9 | 6.2 | <2 | <2 | | | |
| 7-23 | — | —H | mp | 8.0 | A | 47 | 9.1 | 0.25 | <2 | 18 | <2 | <2 | 16 | <2 | <2 |
| 7-24 | —CH₂— | —C₂H₄SO₃⁻ | gel | 1.8 | D | 41 | 4.2 | 0.34 | 5[e] | 4[e] | | | | | |
| 7-25 | —CH₂— | 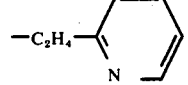 —C₂H₄-pyridyl | gel | 1.8 | A | 25 | 10.2 | 0.50 | 10 | 12 | 7.5 | <1 | 32 | | 6.5 |

TABLE I-continued

Aminopyridine Chelate Resins

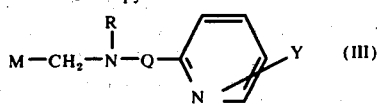

| Resin No | Resin Structure (III: Y = H) Q | R | S/DVB Beads Type[a] | % DVB | Prcs[b] | Resin Product[c] WHC | % N | g/ml | Absorption, mg/ml resin H+form[d] pH 2 Cu | Fe (III) | Ni | Co | pH 4 Cu | Ni | Co |
|---|---|---|---|---|---|---|---|---|---|---|---|---|---|---|---|
| 7-26 | —CH$_2$— | —CH$_2$-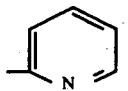 | mp | 6.0 | B | 54 | 10.1 | 0.26 | 20 | 0.8 | 2.8 | 0.1 | 19 | <2 | <2 |
| 7-27 | —CH$_2$— | —H | gel | 1.8 | A | 26 | 8.8 | 0.42 | 25[e] | 11[e] | | | | | |
| 7-28 | —C$_2$H$_4$N—C$_2$H$_4$NCH$_2$— \| CH$_3$ | —CH$_3$ | gel | 1.8 | A | 29 | 11.1 | 0.39 | 22 | 6.7 | 0.7 | 0.1 | 0.7 | 2.7 | 0.7 |
| 7-29 | —(C$_2$H$_4$NH)$_2$CH$_2$— | —C$_2$H$_4$OH | gel | 1.8 | A | 28 | 8.8 | 0.41 | 21.5 | 3.1 | 0.8 | 0.2 | 8.5 | 2.3 | 1.5 |
| 7-30 | —CH$_2$— | —CH$_2$CHNHCH$_2$— \| CH$_3$ | gel | 1.8 | A | 24 | 11.2 | 0.49 | 20 | 2.5 | 0.4 | 0.1 | 6.4 | 0.7 | 1.4 |

[a]Gel or macroporous S/DVB matrix resin
[b]Amination Process:
A 4 hr reflux in toluene, 2 × excess amine
B 2 hr reflux in toluene, 2 × excess amine
C 1 hr at 120° C in DMF, 2 × excess amine
D 72 hr reflux with excess aq. amine
E 2 hr reflux with excess amine in aq. Na$_2$SO$_4$
[c]Resin Product Analyses:
WHC - water holding capacity in free base form
%N - Elemental analysis, dry free base form
g/ml - Density dry free base form
[d]Absorption Test Solution - 1 g/l each of Cu, Fe(III), Ni, Co as sulfates
[e]Test Solution - 2 g Cu/l + 5 g Fe(III)/l
[f]Test Solution - 10 g Cu/l, pH 4
[g]Most probable structure
[h]Y = 6-methyl

EXAMPLE 8

Equilibrium Absorption of Metal Ions

A. The absorpition of a number of other metal ions was determined in experiments in which the HPA resins of Example 2 or BPA resins of Example 3 were equilibrated with dilute solutions of various metal salts at pH 2.0. Adsorption of the metal ion was determined by subsequent analysis of the supernatant solution. The resin loadings and corresponding equilibrium solution concentrations are given in Tables II and III. The distribution coefficient, $D_A^R$, is the ratio of metal concentration in the resin to that of the aqueous solution.

TABLE II

METAL ION ABSORPTION BY HPA RESIN
Aqueous pH = 2.0

| Metal Ion | Solution | Equilibrium Conc. g/l Soln | g/l Resin | $D_A^R$ |
|---|---|---|---|---|
| Cu (II) | Sulfate | 0.63 | 24 | 38 |
| Au(III) (pH = 1) | Chloride | 0.015 | 122 | 8100 |
| Hg (II) | Nitrate | 0.064 | 72 | 1100 |
| Pt (IV) | Chloride | 0.02 | 82 | 4000 |
| V (V) | Sulfate | 0.20 | 57 | 280 |
| Ag | Nitrate | 0.65 | 33 | 51 |
| Cr (VI) | Cr$_2$O$_7^=$/SO$_4^=$ | 0.13 | 65 | 500 |
| Mo (VI) | MoO$_4^=$/SO$_4^=$ | 0.001 | 12.5 | 12,000 |
| Cr (III) | Nitrate | 0.92 | 3 | 3 |
| V (IV) | Chloride | 0.99 | 3.4 | 3 |
| Ni | Chloride | 0.96 | 0.8 | 0.8 |
| Fe (II) | Chloride | 0.95 | 0.8 | 0.8 |
| Cd | Chloride | 0.86 | 1.3 | 1.5 |

TABLE III

METAL ION ABSORPTION BY BPA RESINS

| Metal Ion[a] | Matrix Resin[b] | Equilibrium Conc. g/l Soln | g/l Resin | $D_A^R$ |
|---|---|---|---|---|
| Cu | gel | 1.0 | 33 | 33 |
|  | mp | 1.0 | 28 | 28 |
| Ni | gel | 0.65 | 28 | 43 |
|  | mp | 0.88 | 18 | 20 |
| Fe (III) | gel | 0.79 | 23 | 29 |
|  | mp | 0.82 | 19 | 23 |
|  | mp | 0.83 | 11.5 | 14 |
| Cd | mp | 0.73 | 15 | 21 |
| V (IV) | mp | 0.68 | 19 | 28 |
| Cr (VI) | mp | 0.2 | 62 | 310 |
| Fe (II) | gel | 1.0 | <0.06 | <0.06 |
| Pr | mp | 0.70 | 0.8 | 1.1 |

[a]Sulfate except Cr$_2$O$_7^=$/SO$_4^=$
[b]Gel - S/1.8% DVB; macroporous - S/6% DVB B. One ml of a resin containing the BPA group was shaken with 100 ml of a solution containing about 1 g/l each of Al, Co, Mg (as sulfates) and with a pH of 2.0. After 24 hours the solution was analyzed, (pH still 2.0) and the resin was eluted with 1 N sulfuric acid, and also analyzed. A similar experiment was done with an HPA resin. The results are as follows (Table IV):

TABLE IV

| Metal Ion | BPA Resin Soln g/l | Resin, mg/ml | $D_A^R$ | HPA Resin Soln g/l | Resin mg/ml | $D_A^R$ |
|---|---|---|---|---|---|---|
| Al | 1.05 | 0.01 | 0.01 | 1.04 | 1.5 | 1.5 |
| Mg | 0.94 | 0.05 | 0.05 | 0.96 | 0.8 | 0.8 |

TABLE IV-continued

| Metal Ion | BPA Resin | | | HPA Resin | | |
|---|---|---|---|---|---|---|
| | Soln g/l | Resin, mg/ml | $D_A^R$ | Soln g/l | Resin mg/ml | $D_A^R$ |
| Co | 0.57 | 20 | 35 | 1.06 | 1.1 | 1.0 |

C. A similar experiment was done with the same two resins but with a solution containing about 1 g/l of Zn and about 0.2 g/l of Ca. The initial and final pH was 2.0. The results are as follows (Table V):

TABLE V

| Metal Ion | BPA Resin | | | HPA Resin | | |
|---|---|---|---|---|---|---|
| | Soln g/l | Resin, mg/ml | $D_A^R$ | Soln g/l | Resin mg/ml | $D_A^R$ |
| Zn | 0.59 | 24 | 40 | 1.17 | 0.8 | 0.7 |
| Ca | 0.20 | <0.05 | <0.25 | 0.2 | 0.1 | 0.5 |

D. Further experiments with the BPA resins and several solutions of copper, nickel, cobalt and ferric iron as sulfates gave the following data (Table VI):

TABLE VI

| Metal Ion | Run D-1 | | Run D-2 | | Run D-3 | |
|---|---|---|---|---|---|---|
| | Soln g/l | Resin g/l | Soln g/l | Resin g/l | Soln g/l | Resin g/l |
| Cu | — | — | 0.01 | 17 | — | — |
| Ni | 1.5 | 23 | 0.14 | 8 | — | — |
| Co | — | — | — | — | 0.84 | 9 |
| Fe (III) | 5.0 | 13 | 0.36 | 2.5 | 0.53 | 17 |

The aminopyridine resins of Examples 1-7 have a selectivity desirable for preferential adsorption of valuable metals in the presence of iron, aluminum, magnesium and other less valuable species found in typical hydrometallurgical acid leach liquors. Currently copper is recovered from mine tailings by treatment with dilute acid and precipitation of the copper with scrap iron or selective solvent extraction. The 2-picolylamine resins, and particularly the MPA, BPA, HPA, and PA resins of Examples 1-6, have favorable capacity, selectivity, and regenerabilty for use with dilute copper leach liquors not economically processed by precipitation or solvent extraction.

While the aminopyridine resins can be used in conventional ion exchange units with fixed or fluid bed operation, fixed bed column operations are particularly suitable for detailed evaluation of resin properties and operating conditions. For example, the following procedure is particularly useful for laboratory evaluations.

The resin is conditioned in acid form by washing with at least 50 bed volumes of 0.1 N $H_2SO_4$ at a flow rate of about 0.5 bed volume per minute or less. Then the resin is rinsed with deionized water at a similar flow rate until the effluent pH reaches 2 for copper evaluation, or 3 for nickel. The wet conditioned resin is screened and the −20+30 mesh fraction used for column tests. The test column (1.27 cm i.d.) is loaded with 19.3 ml of the conditioned resin giving a bed depth of about 15.2 cm.

| | Cu Test Feed | | Ni Test Feed |
|---|---|---|---|
| Cu | 2.0 g/l | Ni | 2 g/l |
| Fe (III) | 5.0 g/l | Fe (II) | 5 g/l |
| pH | 2.0 ± 0.1 | pH | 3.0 ± 0.1 |
| Anion | Sulfate/bisulfate | Anion | Sulfate/bisulfate |

Flow rates: 2.0 ml/min for both absorption and elution
Column temperature: 24±2° C
Eluant: 2.0 N sulfuric acid To obtain equilibrium adsorption data, the feed cycle is continued until the effluent concentrations are equal to that of the feed. Then the bed is rinsed with 2 bed volumes of water prior to elution with 2 N sulfuric acid. Samples of the effluent during the loading and elution cycles are taken to define the absorption and elution curves.

EXAMPLE 9

Copper Recovery — HPA Resin

A. A test column as described above was loaded with a macroporous HPA resin. A solution containing 1 g Cu/l, 1 g Fe (III)/l, at pH 2.0, was passed through the bed at a flow rate of 2 ml/min. Less than 0.01 g Cu/l was found in the effluent until about 18 bed volumes (about 360 ml) of the effluent solution had been collected. The effluent copper concentration rose steadily until after about 45 bed volumes it was equal to the feed concentration. The resin bed was washed with about 2 bed volumes of water and eluted with 2 N sulfuric acid. The peak copper concentration in the eluate was found to be 18 g Cu/l, and the ratio of copper to iron in this eluate was 9/1.

B. In another experiment with a similarly loaded copper-iron HPA resin, most of the adsorbed iron was removed by initial elution with 0.1 N sulfuric acid at a flow rate of 1 ml/min. After 8 bed volumes of this solution had been collected about 98% of the iron had been removed, but only 30% of the copper. Subsequent elution of this bed with 2 N sulfuric acid removed the remainder of the copper, producing an eluate where the iron content was only 2% of the copper.

C. The HPA resin bed above was loaded again in the same manner and eluted with 150 ml of 0.1 N sulfuric acid, followed by 160 ml of 2 N ammonium hydroxide. In this case the acid eluant removed 34% of the copper and all of the iron. The ammonium hydroxide eluant then removed the remaining copper.

D. In another run, the resin was first eluted with 80 ml 1 N HCl and then with 125 ml of 2 N sulfuric acid. The HCl eluant removed all of the iron and about 55% of the copper. The remaining copper was removed with the sulfuric acid.

EXAMPLE 10

Copper Recovery — PA Resin

In another experiment a column containing a gel PA resin was loaded by passing 60 bed volumes of a solution containing 2 g Cu/l and 5 g Fe (III)/l through the column at a flow rate of 2 ml/min. The loaded resin contained 35 mg Cu and 7 mg Fe/ml. Elution with 2 N sulfuric acid completely removed all the adsorbed copper and iron giving an eluate Cu/Fe ratio of 5.0.

EXAMPLE 11

Copper Recovery — BPA Resin

A column of gel BPA resin was loaded by passing 85 bed volumes of a solution containing 0.9 g Cu/l and 1.5 g Fe (III)/l through the column. The loaded resin contained 42 mg Cu/ml and 6 mg Fe/ml, about its theoretical capacity. Elution with 40 ml of 1 N sulfuric acid removed 99% of the iron and only 5% of the copper.

The remaining copper was stripped with 10 N sulfuric acid giving an eluate containing only 0.0012 g Fe/g Cu.

EXAMPLE 12

Nickel Recovery

Since the presence of copper in the initial screening tests would mask nickel adsorption, the more active copper resins were further evaluated using a test solution containing 1 g/l each of nickel, iron (III) and cobalt. Typical data are given in Table VII.

TABLE VII

| Resin No. | | Cu Loading[a] | Adsorption of Ni, Co + Fe Adsorption, mg/ml H+ Resin | | |
|---|---|---|---|---|---|
| | | | Ni | Co | Fe |
| 7-26 | BPA | 1.00 | 14[b] | — | 8.8[b] |
| 7-19 | HPA | 0.74 | 0.8[b] | 0.1[b] | — |
| 7-6 | | 0.71 | 2.2 | 0.2 | 3 |
| 7-28 | | 0.69 | 2.7 | 0.3 | 6.1 |
| 7-25 | | 0.50 | 4.0 | 0.2 | 2.2 |
| 7-30 | | 0.46 | 4.9 | 0.4 | 1.5 |
| 7-17 | | 0.34 | 6.5 | 1 | 9.1 |

[a]meq Cu/meq picolylamine
[b]Separate

The bispicolylamine (BPA) resin clearly is the most effective resin for nickel recovery. The other resins with significant Ni capacity also have tridentate functionality. While acid leaching of nickel ores is not widely practiced, the BPA resin has a selectivity and capacity adequate for commercial use with acidic leach liquors.

Data indicate that the 2-picolylamine chelate resins can be used in column operations over a wide range of conditions. The following table indicates the more important process variables and the general and preferred operating ranges for copper and nickel recovery.

| | Process Variable | Preferred | General |
|---|---|---|---|
| 1. | Metal ions adsorbed | Cu, Ni | C, Cd, Zn, Hg, Ag, Pt, V, Cr (VI), Mo |
| 2. | Anions present | Sulfate | Chloride, nitrate, sulfite |
| 3. | Feed pH | 1.0-3.0 | 1.0-5.0 |
| 4. | Temperature | 15°-60° C | 0°-80° C |
| 5. | Flow rate | 0.1-.5 l/min/l resin | Up to 2.5 l/min/l resin |
| 6. | Main eluant | 1-2 N $H_2SO_4$ | 0.1-10 N $H_2SO_4$ 0.1-2 N HCl 0.1-3 N $HNO_3$ 1-10 N $NH_4OH$ |

We claim:

1. A water-insoluble chelate-exchange resin having a crosslinked polymer matrix and pendent thereto a plurality of methyleneaminopyridine groups of Formula III:

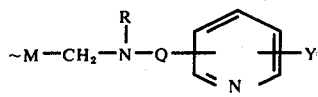

wherein M is the matrix resin;
Y is H or $C_1$-$C_4$ alkyl;
Q is
1. —$CH_2$-;
2. —$(C_2H_3R'NR')_x$—$CH_2$— where each R' is H or $CH_3$ and x is 1 or 2; or
3. —, —NH—, —$C_2H_4$—; and each R is
1. H, $C_1$-$C_4$ alkyl, or $C_2$-$C_4$ hydroxyalkyl;
and when Q is —$CH_2$—, R can also be:
2. allyl, benzyl or o-hydroxybenzyl;

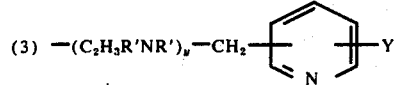

wherein each R' is H or $CH_3$ and y is 0 or 1;
4. —$(CH_2)_mOY$ where m is 2 or 3;
5. —$C_2H_3R'NR_1R_2$ where R' is H or $CH_3$, $R_1$ is H, $C_1$-$C_4$ alkyl, $C_2$-$C_4$ hydroxyalkyl, phenyl or benzyl, and $R_2$ is H, $C_1$-$C_4$ alkyl or $C_2$-$C_4$ hydroxyalkyl;
6. —$C_2H_4SR'''$ where R''' is $C_1$-$C_4$ alkyl;
7. —$C_nH_{2n}COOY$ where n is 1 or 2;
8. —$C_nH_{2n}SO_3^-$ where n is 1 or 2; or
9. —$CH_2Z$ where Z is —$CONH_2$ or —$NHCONH_2$.

2. The chelate resin of claim 1 where the polymer matrix is a crosslinked aromatic resin.

3. The chelate resin of claim 2 where the polymer matrix is a crosslinked styrene-divinylbenzene copolymer.

4. The chelate resin of claim 2 prepared by reacting a chloromethylaromatic polymer with an aminopyridine of Formula II:

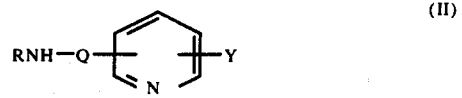

5. The chelate resin of claim 4 where the aminopyridine is a 2-picolylamine of the formula:

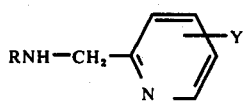

6. The chelate resin of claim 4 where the aminopyridine is a 2-picolylamine of the formula:

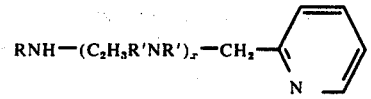

where each R' is H or $CH_3$ and x is 1 or 2.

7. The chelate resin of claim 3 containing a plurality of groups of the formula:

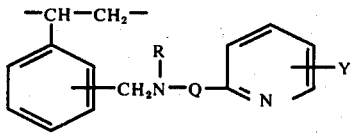

8. The chelate resin of claim 7 where R is $CH_3$, Q is —$CH_2$— and Y is H.

9. The chelate resin of claim 7 where R is H, Q is —$CH_2$— and Y is H.

10. The chelate resin of claim 7 where R is —$C_2H_4OH$, Q is —$CH_2$— and Y is H.

11. The chelate resin of claim 7 where R is —CH$_2$COOH, Q is —CH$_2$— and Y is H.

12. The chelate resin of claim 7 where R is

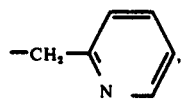

Q is —CH$_2$— and Y is H.

13. The chelate resin of claim 3 containing about 0.1–1.0 chelant groups per aromatic group of the matrix resin and having a capacity of about 0.1–4.5 meq Cu/g acid resin.

14. The chelate resin of claim 13 where the pendent methyleneaminopyridine groups have the formula:

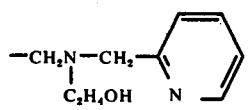

15. The chelate resin of claim 13 where the pendent methyleneaminopyridine groups have the formula:

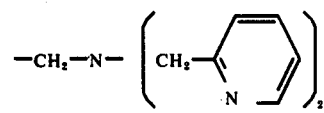

16. A process for preparing the chelate resin of claim 1 by reacting a chloromethylaromatic resin matrix with an aminopyridine of the formula:

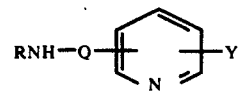

to give a resin having a dry weight capacity of about 0.1–4.5 meq Cu/g acid resin.

17. The process of claim 16 where the resin matrix is a styrene-divinylbenzene copolymer bead and the aminopyridine is a 2-picolylamine.

18. The process of claim 16 where the amine is N-methyl-2-picolylamine.

19. The process of claim 16 where the amine is N-(2-hydroxyethyl)-2-picolylamine.

20. The process of claim 16 where the amine is bis-(2-picolylamine).

* * * * *

UNITED STATES PATENT AND TRADEMARK OFFICE
CERTIFICATE OF CORRECTION

PATENT NO. : 4,031,038
DATED : June 21, 1977
INVENTOR(S) : Robert R. Grinstead & Wilmonte A. Nasutavicus It is certified that error appears in the above-identified patent and that said Letters Patent are hereby corrected as shown below:

On the title page, under References Cited, delete "Schmucklea" and insert --Schmuckler--.

Column 5, line 23, delete "molybdenium" and insert --molybdenum--.

Column 5, line 38, delete "Dowex A" and insert --Dowex® A--.

Column 5, line 55, delete "10°-g/1C." and insert --10°-100°C.--.

Column 5, line 68, delete "processng" and insert --processing--.

Column 6, line 39, delete "occured" and insert --occurred--.

Column 6, line 64, delete "A" and insert --A.--.

Column 7, line 21, after "percent of", insert --the--.

Column 7, line 66, after "beads!", insert --The--.

Column 8, line 8, delete "N-((2-Hydroxyethyl)" and insert --N-(2-Hydroxyethyl)--.

Column 9, line 6, after "weak", insert --base--.

Column 9, line 10, delete "coverted" and insert --converted--.

In Table I, Columns 9-12, entries should appear as follows:

Resin No. 7-17: Under the heading "Fe III", delete "43" and insert --4.3--.

Resin No. 7-19: Under the heading "Cu", second instance, the entry "<2" should be moved to be under the heading "Co".

UNITED STATES PATENT AND TRADEMARK OFFICE
CERTIFICATE OF CORRECTION

PATENT NO. : 4,031,038      Page 2 of 2
DATED : June 21, 1977
INVENTOR(S) : Robert R. Grinstead & Wilmonte A. Nasutavicus It is certified that error appears in the above-identified patent and that said Letters Patent are hereby corrected as shown below:

Resin No. 7-22: Under the heading "g/ml", delete ".47" and insert --0.47--.

Resin No. 7-30: Under "R", the formula should be  --.

Column 11, line 42, delete "absorpition" and insert --absorption--.

Column 13, line 42, delete "regenerabilty" and insert --regenerability--.

Column 15, line 39, in table line 1, under the heading "General", delete "C" and insert --Co--.

Column 15, line 39, in table line 5, under the heading "preferred", delete "0.1-.5" and insert --0.1-0.5--.

Signed and Sealed this

Fifteenth Day of November 1977

[SEAL]

Attest:

RUTH C. MASON
Attesting Officer

LUTRELLE F. PARKER
Acting Commissioner of Patents and Trademarks